United States Patent
Sumitani

(10) Patent No.: US 7,689,101 B2
(45) Date of Patent: Mar. 30, 2010

(54) VIDEO AUDIO RECORDING SYSTEM

(75) Inventor: Hideaki Sumitani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1358 days.

(21) Appl. No.: 11/126,398

(22) Filed: May 11, 2005

(65) Prior Publication Data

US 2005/0254789 A1 Nov. 17, 2005

(30) Foreign Application Priority Data

May 12, 2004 (JP) .............................. P2004-142586

(51) Int. Cl.
H04N 7/00 (2006.01)
H04N 5/91 (2006.01)
H04N 7/12 (2006.01)
H04N 9/00 (2006.01)

(52) U.S. Cl. .................. 386/95; 386/39; 386/75; 386/96; 386/100; 386/104; 348/462; 375/240.28

(58) Field of Classification Search .................. None
See application file for complete search history.

(56) References Cited

U.S. PATENT DOCUMENTS

| 5,434,892 | A | * | 7/1995 | Dike et al. | 375/377 |
| 5,732,286 | A | * | 3/1998 | Leger | 710/57 |
| 5,905,845 | A | * | 5/1999 | Okada et al. | 386/98 |
| 2002/0159758 | A1 | * | 10/2002 | Okuyama et al. | 386/95 |
| 2004/0028387 | A1 | * | 2/2004 | Winter | 386/95 |

FOREIGN PATENT DOCUMENTS

| JP | 2001-135017 | 5/2001 |
| JP | 2001-251588 | 9/2001 |

* cited by examiner

*Primary Examiner*—Thai Tran
*Assistant Examiner*—Syed Y Hasan
(74) *Attorney, Agent, or Firm*—Morgan, Lewis & Bockius LLP

(57) ABSTRACT

A video audio recording system includes an inputting means for inputting video audio information, a video audio coding means for converting the input video audio information into digital information to write into a buffer means once and reading the written video audio information sequentially to output, a signal processing means for converting the video audio information output from the video audio coding means into a recording-medium writable format to write on a recording medium, and a controlling means for controlling respective means to control a recording of information on the recording medium. The controlling means monitors a write address and a read address of the buffer means, and then brings only a writing of information into the buffer means into a stop condition if a difference between both addresses is smaller than a predetermined threshold.

4 Claims, 3 Drawing Sheets

VIDEO AUDIO RECORDING SYSTEM

BACKGROUND OF THE INVENTION

1. Field of the Invention

The present invention relates to a video audio recording system capable of avoiding previously a buffer memory overflow in recording and, more particularly, a DVD recorder for executing the recording in compliance with a DVD video format or a DVD-VR format.

2. Description of the Related Art

Normally, the DVD recorder includes an inputting means for inputting video audio information, an A/V encoder for converting the input video audio information into digital signals and writing them in an encode buffer once and then reading the written video audio information sequentially to output, an ATAPI controller and a signal processor for executing a signal processing to convert the video audio information output from the A/V encoder into a optical-disc writable format and write the information on an optical disc, and an MCU as a controlling means for controlling respective means to control the recording of the information on the optical disc.

The DVD recorder constructed in this manner possesses such a defect that the system itself is caused to stop when the encode buffer overflows in recording the information. For this reason, various measures for preventing a failure of the system in advance by avoiding an overflow of the encode buffer have been proposed in the prior art (for example, see JP-A-2001-251588).

In JP-A-2001-251588, the video audio recording system in which the recording on the disc is terminated in unit of video object (VOB) when the overflow of the buffer occurs is set forth.

In this manner, because the recording on the disc is terminated in unit of video object (VOB) at the time of buffer overflow, the overflow of the buffer can be avoided and thus the failure of the system can be prevented previously.

Meanwhile, in the DVD-VIDEO standard, for example, the "Cell" as play unit of real-time data is constructed by one VOB (Video Object) in recording the information on the optical disc and also one VOB is constructed by a plurality of VOBUs (Video Object Units), but it is stipulated that the number of "Cells" may be used up to 255.

Therefore, there exists the problem that, if the VOB terminating process is repeated at the time of buffer overflow, the control information are limited and thus there is a likelihood that a long-time recording cannot be accomplished.

The present invention has been made to overcome such problems and it is an object of the present invention to provide a video audio recording system capable of avoiding previously a system mismatching caused by a buffer overflow while maintaining a long-time recording.

SUMMARY OF THE INVENTION

A video audio recording system of the present invention includes an inputting means for inputting video audio information, a video audio coding means for converting the input video audio information into digital information to write into a buffer means once, and then reading the written video audio information sequentially to output, a signal processing means for converting the video audio information output from the video audio coding means into a recording-medium writable format to write on a recording medium, and a controlling means for controlling respective means to control a recording of information on the recording medium, wherein the controlling means monitors a write address and a read address of the buffer means, and then brings only a writing of information into the buffer means into a stop condition if a difference between both addresses is smaller than a predetermined threshold.

In this case, a stop threshold used to stop the writing of information and a start threshold used to start the writing of information again are prepared as the threshold, and the controlling means can be constructed such that the controlling means brings only the writing of information into the buffer means into a stop condition if the difference is smaller than the stop threshold and also starts the writing of information again if the difference is larger than the start threshold. With this arrangement, the video and the audio recorded on the recording medium are interrupted slightly, but no system mismatching is generated and also a failure of the system can be prevented beforehand.

Also, in addition to the above configuration, the video audio recording system may further include a reducing threshold to reduce a writing rate of the information. In this case, the controlling means reduces the writing rate into the buffer means to continue the writing if the difference is smaller than the reducing threshold, and then brings only the writing of information into the buffer means into a stop condition if the difference is smaller than the stop threshold in this continued condition. In this manner, because the writing rate is reduced before the difference between the write address and the read address becomes smaller than the stop threshold, the halt of the writing of information into the buffer can be avoided previously. As a result, it is possible to avoid such a defect that the video and the audio to be recording is caused to interrupt.

Also, a video audio recording system of the present invention includes an inputting means for inputting video audio information, a video audio coding means for converting the input video audio information into digital information to write into a buffer means once, and then reading the written video audio information sequentially to output, a signal processing means for converting the video audio information output from the video audio coding means into a optical-disc writable format to write on an optical disc, and a controlling means for controlling respective means to control a recording of information on the optical disc, wherein the controlling means monitors a buffer value of control information to be written into the buffer means in accordance with a recording mode and a buffer value of control information to be processed in the buffer means, and then brings only the writing of information into the buffer means into a stop condition if a positional difference between both buffer values is smaller than a predetermined specified value. Here, the buffer value of the control information is a buffer value of NV_PCK when the recording mode is a DVD video mode and also is a buffer value of RDI_PCK when the recording mode is a DVD-VR mode.

In this case, a stop specified value used to stop the writing of information and a start specified value used to start the writing of information again are prepared as the specified value, and the controlling means brings only the writing of information into the buffer means into a stop condition if the positional difference is smaller than the stop specified value and also starts the writing of information again if the positional difference is larger than the start specified value. With this arrangement, the video and the audio recorded on the recording medium are interrupted slightly, but no system mismatching is generated and also a failure of the system can be prevented previously.

Also, in addition to the above configuration, the video audio recording system may further include a reducing specified value reduce a writing rate of the information. In this case, the controlling means reduces the writing rate into the buffer means to continue the writing if the positional difference is smaller than the reducing specified value and then brings only the writing of information into the buffer means into a stop condition if the positional difference is smaller than the stop specified value in this continued condition. In this manner, because the writing rate is reduced before the positional difference between the buffer value of NV_PCK or RDI_PCK to be written into the buffer means and the buffer value of NV_PCK or RDI_PCK to be processed in the buffer means becomes smaller than the stop specified value, the halt of the writing of information into the buffer can be avoided previously. As a result, it is possible to avoid such a defect that the video and the audio to be recording is caused to interrupt.

In addition, a video audio recording system of the present invention includes an inputting means for inputting video audio information, a video audio coding means for converting the input video audio information into digital information to write into a buffer means once, and then reading the written video audio information sequentially to output, a signal processing means for converting the video audio information output from the video audio coding means into a optical-disc writable format to write on an optical disc, and a controlling means for controlling respective means to control a recording of information on the optical disc, wherein the controlling means monitors a write address and a read address of the buffer means and also monitors a buffer value of control information to be written into the buffer means in compliance with a recording mode and a buffer value of control information to be processed in the buffer means, and then brings only the writing of information into the buffer means into a stop condition if at least one of a condition that a difference between the write address and the read address is smaller than a predetermined threshold or a condition that a positional difference between the buffer value of control information to be written into the buffer means and the buffer value of control information to be processed in the buffer means is smaller than a predetermined specified value is satisfied. Here, the buffer value of the control information is a buffer value of NV_PCK when the recording mode is a DVD video mode and also is a buffer value of RDI_PCK when the recording mode is a DVD-VR mode.

In this case, a stop threshold used to stop the writing of information and a start threshold used to start the writing of information again are prepared as the threshold, and also a stop specified value used to stop the writing of information and a start specified value used to start the writing of information again are prepared as the specified value. Then, the controlling means reduces the writing rate into the buffer means to continue the writing if the difference between the write address and the read address of the buffer means is smaller than the predetermined reducing threshold or if the positional difference between the write address and the read address of the buffer means is smaller than the predetermined reducing specified value. Also, the controlling means brings only the writing of information into the buffer means into a stop condition if at least one of a condition that the difference between the write address and the read address is smaller than the predetermined stop threshold or a condition that the positional difference between the buffer value of NV_PCK or RDI_PCK to be written into the buffer means and the buffer value of NV_PCK or RDI_PCK to be processed in the buffer means is smaller than the predetermined stop specified value is satisfied under the continued condition. Then, as the result that the writing onto the recording medium (optical disc) is continued by continuing the reading of information from the buffer means, if the difference becomes larger than the predetermined start threshold and if the positional difference becomes larger than the predetermined start specified value, the controlling means starts the writing of information into the buffer means once again.

In this manner, both the write address and the read address of the buffer means and the buffer value of control information to be written into the buffer means in compliance with the recording mode and the buffer value of control information to be processed in the buffer means are monitored, and then control of the writing of information into the buffer means is carried out based on respective differences. As a result, it is feasible to avoid the generation of the buffer overflow without fail.

According to the video audio recording system of the present invention, since the buffer overflow can be avoided without fail while maintaining the long-time recording, generation of the situation such as the system mismatching caused by the buffer overflow, i.e., the failure of the system, can be avoided previously.

DETAILED DESCRIPTION OF THE INVENTION

Embodiments of the present invention will be explained with reference to the drawings hereinafter.

Figure 1:
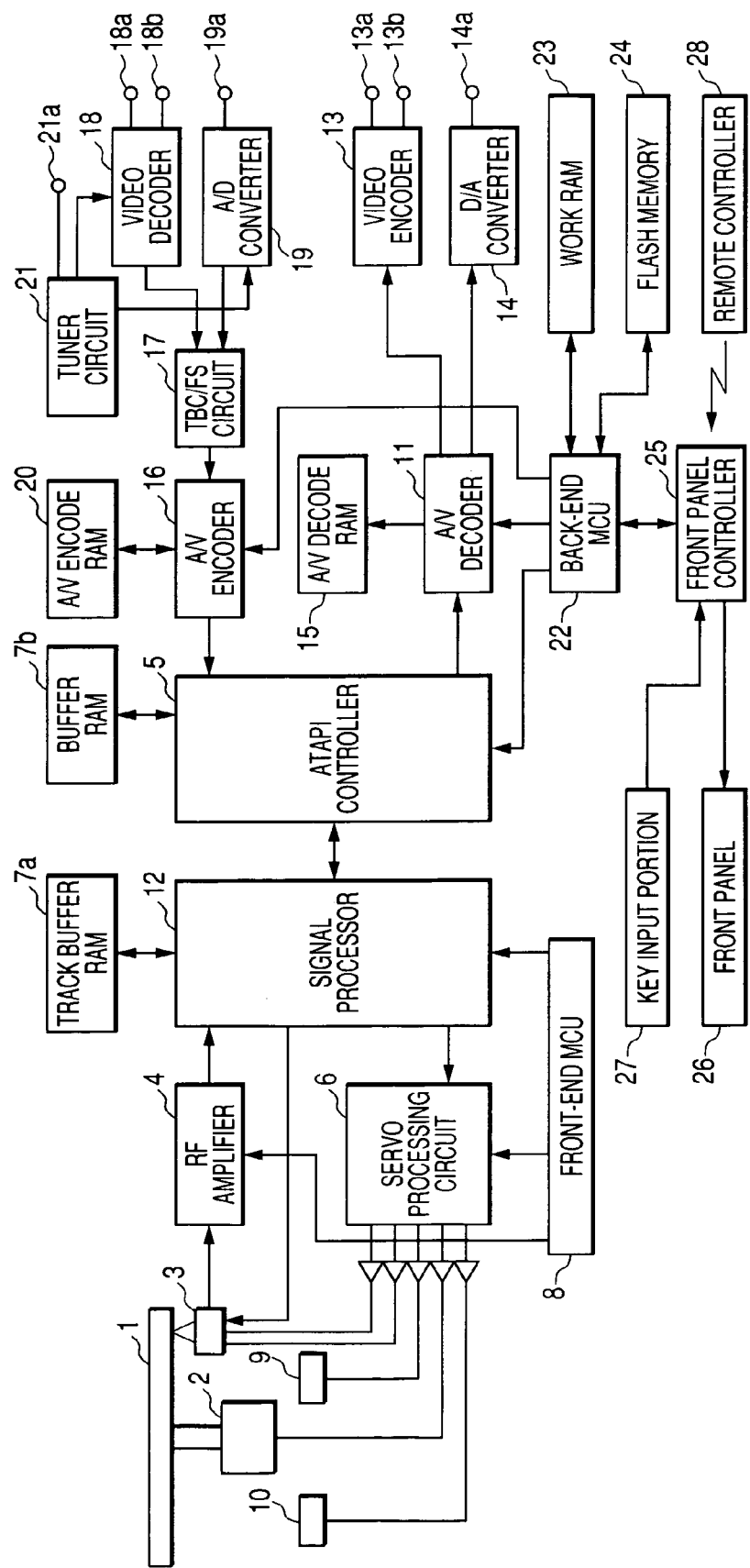
FIG. 1 is a circuit block diagram of a DVD recorder according to a video audio recording system of the present invention.

FIG. 1 is a circuit block diagram of a DVD recorder according to a video audio recording system of the present invention.

A pickup 3 senses the information from an optical disc 1 that is rotated/driven by a disc motor 2. Then, an output of the pickup 3 is fed to an ATAPI controller 5 and a signal processor 12 via an RF amplifier 4. Also, a track buffer RAM (SDRAM, or the like) 7a is connected to the signal processor 12. This track buffer RAM 7a stores once the data (the data are amplified by the RF amplifier 4 and compressed based on MPEG herein) decoded in compliance with the DVD standard. The RF amplifier 4 and the signal processor 12 are controlled by a front-end MCU 8.

A servo processing circuit 6 executes the servo control of a focusing servo and a tracking servo of the pickup 3, in accordance with commands and control data that are transmitted/received from the front-end MCU 8 via the signal processor 12. Also, the servo processing circuit 6 executes control of a thread motor 9 that moves the overall pickup 3 in the radial direction of the optical disc 1, and control of a tray motor 10 that drives a tray (not shown) on which the optical disc 1 is loaded.

Also, the signal processor 12 is connected to an A/V (Audio/Video) decoder 11 via the ATAPI controller 5 to which a buffer RAM 7b is connected. An output of the A/V decoder 11 is connected to a video encoder 13 having video output terminals 13a, 13b and a D/A converter 14 having an audio output terminal 14a. The A/V decoder 11 expands the data that are compressed based on MPEG read from the track buffer RAM 7a. Also, an A/V decode RAM (SDRAM, or the like) 15 for storing the expanded digital data by several screens is connected to the A/V decoder 11.

Also, an output of a video decoder 18 having video input terminals 18a, 18b and an output of an A/D converter 19 having an audio input terminal 19a are connected to an A/V encoder 16 via a TBC/FS (Time Base Corrector/Frame Synchronizer) circuit 17. Also, an output of the A/V encoder 16 is connected to the signal processor 12 via the ATAPI controller 5. Also, outputs of a tuner circuit 21 having an antenna terminal 21a are fed to the video decoder 18 and the A/D converter 19 respectively. The A/V encoder 16 compresses the data stored in an A/V encode RAM 20 based on MPEG and outputs the compressed data to the ATAPI controller 5.

Also, the ATAPI controller 5, the A/V decoder 11, and the A/V encoder 16 are connected to a back-end MCU 22. Also, a work RAM 23 and a flash memory 24 are connected to the back-end MCU 22.

Also, a front panel controller 25 for executing the display control of a front panel 26 made of LCD, or the like is connected to the back-end MCU 22. Also, an output of a key input portion 27 is fed to the front panel controller 25. Also, a receiver portion (not shown) for receiving a transmitted signal from a remote controller 28 is provided to the front panel controller 25.

Next, an operation of the DVD recorder having the above configuration in the recording will be explained in brief hereunder. In this case, an operation in a recording mode in compliance with the DVD-VIDEO standard will be explained herein. Also, explanation will be made of the case where the video (image) signal and the audio (sound, etc.) signal are input from the video input terminals 18a, 18b and the audio input terminal 19a.

The analogue video signal being input from the video input terminals 18a, 18b is converted by the video decoder 18 from the analogue signal to the digital signal, and then input into the TBC/FS circuit 17. Similarly, the analogue audio signal being input from the audio input terminal 19a is converted by the A/D converter 19 from the analogue signal to the digital signal, and then input into the TBC/FS circuit 17. The TBC/FS circuit 17 applies various processes such as time base correction, frame synchronization, and the like to these input signals, and then transfers the processed signals to the A/V encoder 16. The A/V encoder 16 generates the stream data by executing the compression of the video data based on MPEG, the compression of the audio data, the addition of NV_PCK, etc. Such stream data are written once into the A/V encode RAM 20 to accumulate therein, then read again from the A/V encode RAM 20, and then transferred sequentially to the ATAPI controller 5. The ATAPI controller 5 accumulates sequentially the transferred video data in the buffer RAM 7b. At this time, necessary information of NV_PCK are added by the back-end MCU 22. Then, the front-end MCU 8 waits for the writing instruction issued from the back-end MCU 22.

When received the writing instruction issued from the back-end MCU 22, the front-end MCU 8 reads the data accumulated in the buffer RAM 7b, and then accumulates the data in the track buffer RAM 7a of the signal processor 12 once via the ATAPI controller 5. The signal processor 12 controls the servo processing circuit 6 and the pickup 3 to record the data on the optical disc 1.

In this case, the above recording operation is executed in compliance with the DVD-VIDEO standard. In the case of the recording operation executed in compliance with the DVD-VR standard, the above NV_PCK is replaced with RID_PCK.

Next, various embodiments of a buffer overflow avoiding operation in the recording mode in the DVD recorder having the above configuration will be explained hereunder.

Embodiment 1

Figure 2:
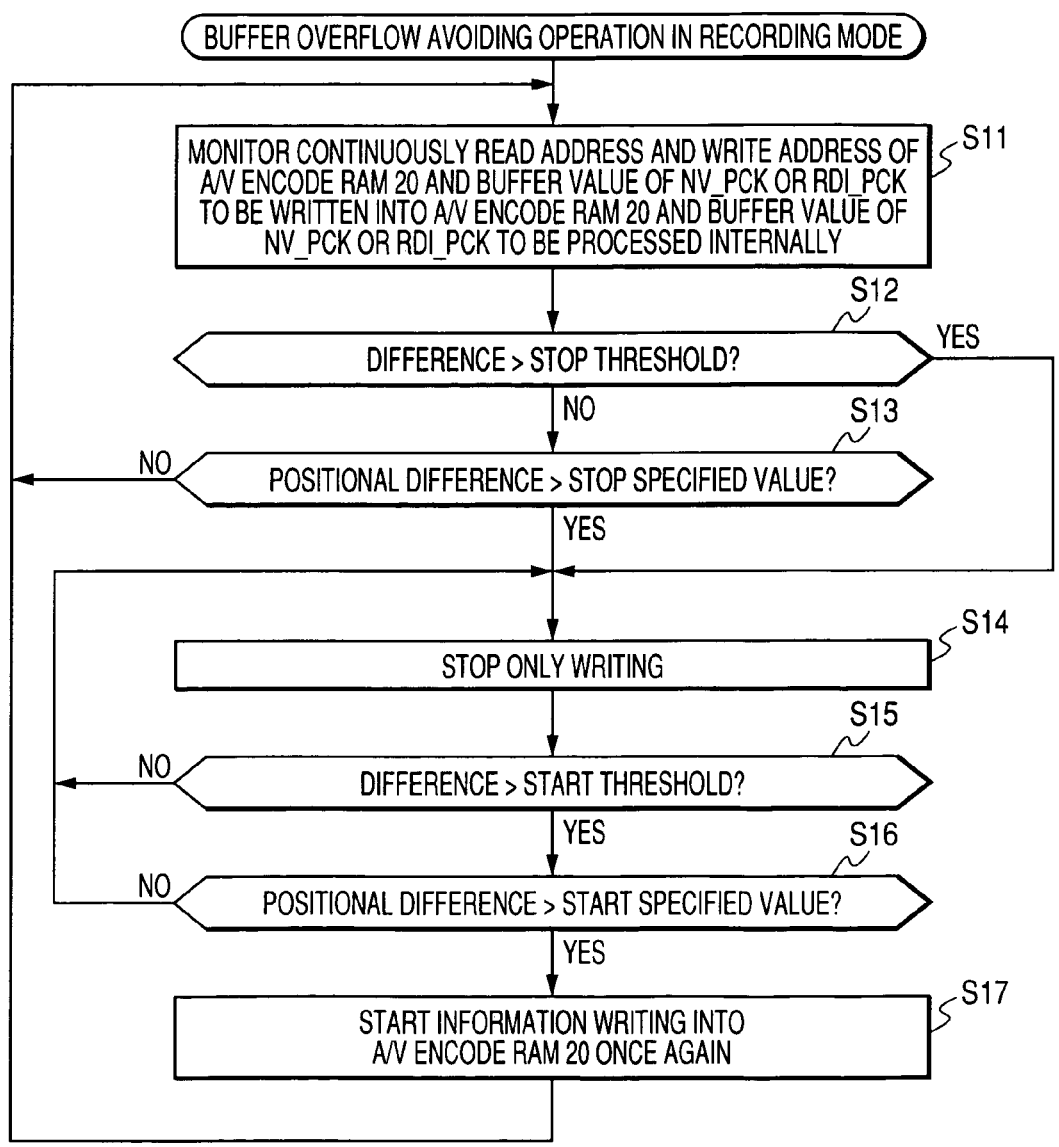
FIG. 2 is a flowchart showing process procedures of a buffer overflow avoiding operation in a recording mode in an embodiment 1, in the DVD recorder of the present embodiment.

An avoiding operation in an embodiment 1 will be explained with reference to a flowchart shown in FIG. 2 hereunder.

In the recording operation, the back-end MCU 22 monitors continuously the read address and the write address of the A/V encode RAM 20 and a buffer value of NV_PCK or RDI_PCK as the control information to be written into the A/V encode RAM 20 and a buffer value of NV_PCK or RDI_PCK to be processed in the A/V encode RAM 20 (step S11).

Then, the back-end MCU 22 compares a difference between the write address and the read address with a predetermined stop threshold (step S12). Also, the back-end MCU 22 compares a positional difference between the buffer value of NV_PCK or RDI_PCK to be written into the A/V encode RAM 20 and the buffer value of NV_PCK or RDI_PCK to be processed in the A/V encode RAM 20 with a predetermined stop specified value (step S13). Here, as a particular example of the stop threshold may be set arbitrarily in unit of VOBU such as 2VOBU, 3VOBU, or the like, for example. A particular numerical value given as the stop specified value is omitted herein, but such numerical value may be set in the similar way.

As a result, if it is decided that the difference between the write address and the read address is smaller than the stop threshold (if Yes in step S12) or if it is decided that the positional difference between the buffer value of NV_PCK or RDI_PCK to be written into the A/V encode RAM 20 and the buffer value of NV_PCK or RDI_PCK to be processed in the A/V encode RAM 20 is smaller than the stop specified value (if Yes in step S13), the back-end MCU 22 brings only the writing of the information (compressed data of the video signal and the audio signal) into the A/V encode RAM 20 into a stop condition (step S14). Then, only the reading of the information from the A/V encode RAM 20 is still continued, and also the writing of the information onto the optical disc 1 is still continued.

In this manner, in the condition that merely the reading of the information from the A/V encode RAM 20 is continued and the writing of the information into the A/V encode RAM 20 is stopped, the back-end MCU 22 compares a difference between the write address and the read address of the A/V encode RAM 20 with a predetermined start threshold (step S15), and also compares a positional difference positional difference between the buffer value of NV_PCK or RDI_PCK to be written into the A/V encode RAM 20 and the buffer value of NV_PCK or RDI_PCK to be processed in the A/V encode RAM 20 with a predetermined start specified value (step S16). Here, as a particular example of the start threshold may be set arbitrarily such as 4VOBU, 5VOBU, or the like, for example. This is applied similarly to the start specified value.

As a result, if it is decided that the difference between the write address and the read address is larger than the start threshold (if Yes in step S15) and if it is decided that the positional difference between the buffer value of NV_PCK or RDI_PCK to be written into the A/V encode RAM 20 and the buffer value of NV_PCK or RDI_PCK to be processed in the A/V encode RAM 20 is larger than the start specified value (if Yes in step S16), the back-end MCU 22 decides that a write enable area of the A/V encode RAM 20 can be secured sufficiently and no overflow occurs. Thus, the back-end MCU 22 starts the writing of the information (compressed data of the video signal and the audio signal) into the A/V encode RAM 20 once again (step S17). Accordingly, the normal recording mode is started once again.

In the embodiment 1, the back-end MCU 22 monitors continuously the read address and the write address of the A/V encode RAM 20 and both the buffer value of NV_PCK or RDI_PCK as the control information to be written into the A/V encode RAM 20 and the buffer value of NV_PCK or RDI_PCK to be processed in the A/V encode RAM 20 (step S11 to step S13). In this event, the back-end MCU 22 can carry out the above control by executing only any one of the monitorings (that is, either the monitoring in step S12 or the monitoring in step S13).

Also, in the embodiment 1, the hysteresis is provided to the threshold and the specified value in two stages as the start phase and the stop phase respectively. However, in order to reduce a recording stop time, the hysteresis is not always provided. For example, the buffer overflow avoiding operation may be carried out only by the threshold and the specified value for the stop. In this case, if it is decided that the recording stop occurs frequently when only the threshold and the specified value for the stop are used as the criterions, the threshold and the specified value for the start may be used together with the above criterions at that point of time.

Embodiment 2

The present embodiment gives an embodiment in which a new concept of a reducing threshold and a reducing specified value is introduced further into the avoiding operation in the embodiment 1. An overflow avoiding operation in an embodiment 2 will be explained with reference to a flowchart shown in FIG. 3 hereunder. In this case, only respective portions different from those in the embodiment 1 will be explained herein.

In the recording operation, the back-end MCU 22 monitors continuously the write address and the read address of the A/V encode RAM 20 and the buffer value of NV_PCK or RDI_PCK as the control information to be written into the A/V encode RAM 20 and the buffer value of NV_PCK or RDI_PCK to be processed in the A/V encode RAM 20 (step S21).

Then, the back-end MCU 22 compares a difference between the write address and the read address with a predetermined reducing threshold (step S22). Also, the back-end MCU 22 compares a positional difference between the buffer value of NV_PCK or RDI_PCK to be written into the A/V encode RAM 20 and the buffer value of NV_PCK or RDI_PCK to be processed in the A/V encode RAM 20 with a predetermined reducing specified value (step S23). Here, as a particular example of the reducing threshold may be set arbitrarily in unit of VOBU such as 9VOBU (Video Object Unit), 10VOBU, or the like, for example. The reducing specified value may be set in the similar way.

As a result, if it is decided that the difference between the write address and the read address is smaller than the reducing threshold (if Yes in step S22) or if it is decided that the positional difference between the buffer value of NV_PCK or RDI_PCK to be written into the A/V encode RAM 20 and the buffer value of NV_PCK or RDI_PCK to be processed in the A/V encode RAM 20 is smaller than the reducing specified value (if Yes in step S23), the back-end MCU 22 reduces a writing rate of the information into the A/V encode RAM 20 and continues the writing into the A/V encode RAM 20 (step S24). Then, the back-end MCU 22 advances the process to step S12 shown in FIG. 2. Then, the processes in step S12 et seq. are executed.

In this manner, in the embodiment 2, the writing rate of the information is reduced before the difference between the write address and the read address becomes smaller than the reducing threshold. Therefore, such a situation can be avoided beforehand that the writing of the information into the A/V encode RAM 20 is stopped.

Figure 3:
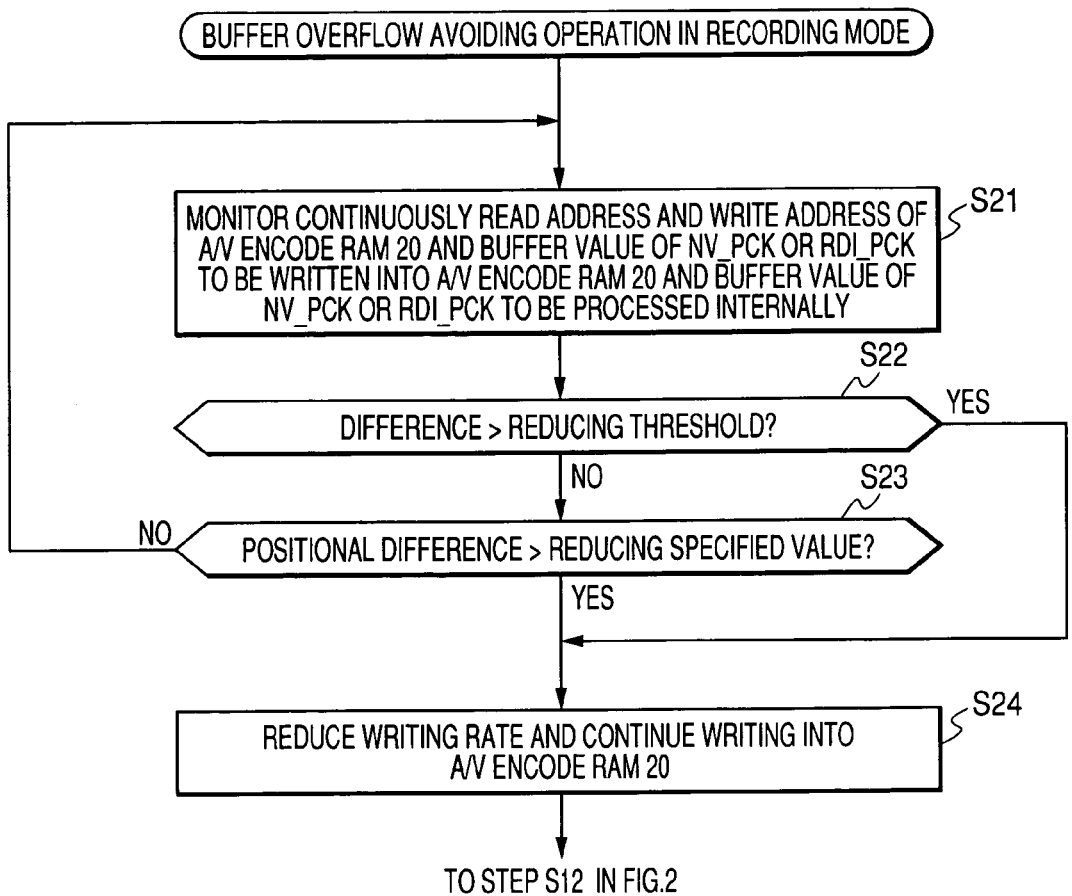
FIG. 3 is a flowchart showing process procedures of a buffer overflow avoiding operation in a recording mode in an embodiment 2, in the DVD recorder of the present embodiment.

In this case, although not shown in the flowchart in FIG. 3, as the result of reduction in the writing rate in step S24, if the difference between the write address and the read address becomes larger than the reducing threshold again or if the positional difference between the buffer value of NV_PCK or RDI_PCK to be written into the A/V encode RAM 20 and the buffer value of NV_PCK or RDI_PCK to be processed in the A/V encode RAM 20 becomes larger than the predetermined reducing specified value again, the back-end MCU 22 causes the reduced writing rate to return to the original rate and continues the writing.

What is claimed is:

1. A video audio recording system comprising:
an inputting means for inputting video audio information;
a video audio coding means for converting the input video audio information into digital information to write into a buffer means once, and then reading the written video audio information sequentially to output;
a signal processing means for converting the video audio information output from the video audio coding means into a optical-disc writable format to write on an optical disc; and
a controlling means for controlling a buffer means, wherein the controlling means monitors a write address and a read address of the buffer means and also monitors a buffer value of NV_PCK or RDI_PCK to be written into the buffer means in compliance with each recording mode of a DVD video mode or a DVD-VR mode and a buffer value of NV_PCK or RDI_PCK to be processed in the buffer means, then reduces a writing rate into the buffer means and continues a writing if a difference between the write address and the read address is smaller than a predetermined reducing threshold or if a positional difference between both buffer values is smaller than a predetermined reducing specified value, then brings only the writing of information into the buffer means into a stop condition if at least one of a condition that the difference between the write address and the read address is smaller than a predetermined stop threshold and a condition that the positional difference between the buffer value of NV_PCK or RDI_PCK to be written into the buffer means and the buffer value of NV_PCK or RDI_PCK to be processed in the buffer means is smaller than a predetermined stop specified value is satisfied under the continued condition, and then starts the writing of information into the buffer means once again if the difference becomes larger than a predetermined start threshold and if the positional difference becomes larger than a predetermined start specified value.

2. A video audio recording system comprising:
an inputting means for inputting video audio information;
a video audio coding means for converting the input video audio information into digital information to write into a buffer means once, and then reading the written video audio information sequentially to output;
a signal processing means for converting the video audio information output from the video audio coding means into a optical-disc writable format to write on an optical disc; and a controlling means for controlling a buffer means, wherein the controlling means monitors a write address and a read address of the buffer means and also monitors a buffer value of control information to be written into the buffer means in compliance with a recording mode and a buffer value of control information to be processed in the buffer means, and then brings only the writing of information into the buffer means into a stop condition if at least one of a condition that a difference between the write address and the read address is smaller than a predetermined threshold and a condition that a positional difference between the buffer value of control information to be written into the buffer means and the buffer value of control information to be processed in the buffer means is smaller than a predetermined specified value is satisfied;

wherein the buffer value of the control information is a buffer value of NV_PCK when the recording mode is a DVD video mode and is a buffer value of RDI_PCK when the recording mode is a DVD-VR mode.

3. The video audio recording system according to claim 2, wherein the threshold includes a stop threshold used to stop the writing of information and a start threshold used to start the writing of information again, the specified value includes a stop specified value used to stop the writing of information and a start specified value used to start the writing of information again, and the controlling means brings only the writing of information into the buffer means into a stop condition if the difference is smaller than the stop threshold or if the positional difference is smaller than the stop specified value and also starts the writing of information again if the difference is larger than the start threshold and if the positional difference is larger than the start specified value.

4. A video audio recording method comprising:

inputting video audio information;

converting the input video audio information into digital information to write into a buffer means once, and reading the written video audio information sequentially to output;

converting the video audio information output from the video audio coding means into a optical-disc writable format to write on an optical disc;

controlling the buffer means by:

monitoring a write address and a read address of the buffer means and also monitoring a buffer value of NV_PCK or RDI_PCK to be written into the buffer means in compliance with each recording mode of a DVD video mode or a DVD-VR mode and a buffer value of NV_PCK or RDI_PCK to be processed in the buffer means;

reducing a writing rate into the buffer means and continuing a writing if a difference between the write address and the read address is smaller than a predetermined reducing threshold or if a positional difference between both buffer values is smaller than a predetermined reducing specified value;

bringing only the writing of information into the buffer means into a stop condition if at least one of a condition that the difference between the write address and the read address is smaller than a predetermined stop threshold and a condition that the positional difference between the buffer value of NV_PCK or RDI_PCK to be written into the buffer means and the buffer value of NV_PCK or RDI_PCK to be processed in the buffer means is smaller than a predetermined stop specified value is satisfied under the continued condition; and starting the writing of information into the buffer means once again if the difference becomes larger than a predetermined start threshold and if the positional difference becomes larger than a predetermined start specified value.

* * * * *